United States Patent [19]
Hansen et al.

[11] Patent Number: 6,036,275
[45] Date of Patent: Mar. 14, 2000

[54] ATTACHMENT MOUNTING STRUCTURE

[75] Inventors: Loren Fredrick Hansen, Lincoln, Nebr.; Mark Edward Lamb, Mayville, Wis.

[73] Assignee: Deere & Company, Moline, Ill.

[21] Appl. No.: 09/014,853

[22] Filed: Jan. 29, 1998

[51] Int. Cl.⁷ ........................................................ B60P 1/16
[52] U.S. Cl. .................... 298/17 T; 298/1 A; 298/17 B; 410/80; 239/657
[58] Field of Search .................................. 298/1 A, 1 C, 298/22 R, 17 B, 17 T; 280/DIG. 8; 410/80; 239/657

[56] References Cited

U.S. PATENT DOCUMENTS

| | | | |
|---|---|---|---|
| 4,596,347 | 6/1986 | Hite | 298/17 T |
| 4,995,773 | 2/1991 | Lamoureux et al. | 298/1 X |
| 5,267,779 | 12/1993 | Talamantez, Jr. et al. | 298/1 A |
| 5,836,657 | 11/1998 | Tilley et al. | 298/1 A |

FOREIGN PATENT DOCUMENTS 1147037  11/1957  France ...................................... 410/80

OTHER PUBLICATIONS

Deere & Company, John Deere AMT Transports, pp. 1–8, dated Nov. 1988, published in U.S.A.
Deere & Company, 1500 Utility Vehicle, cover page, p. 14 and 15, dated Dec. 7, 1988, published in U.S.A.
The Toro Company, 4–Wheel Drive Without Turf Scuffing, 1 page, date—unknown, published in U.S.A.
The Toro Company, Workman 3000 Series, p. 1–6, dated 1992, published in U.S.A.
The Toro Company, Workman 3000 Series–The Work Vehicle Choice With More Utility, p. 1–2, dated 1993, published in U.S.A.
Smithco, The new Runaway makes all other turf maintenance trucks obsolete, p. 1–2, dated Feb. 1989, published in U.S.A.
Jacobsen, Division of Textron Inc., 810 Express Utility Trucks, p. 1–4, dated 1992,published in U.S.A.
E–Z–Go, Division of Textron Inc., Turf Vehicles, p. 1–18, dated 1988, published in U.S.A.
Smithco, When Precision Counts, Count on the Superiority of Spray Star, p. 1–2, dated Feb. 1990, published in U.S.A.
Smithco, Sprayers 110–125–150 Gallon, p. 1–4, dated Feb. 1989, published in U.S.A.
E–Z–Go, E–Z–Go Turf Vehicles, p. 1–14, dated Feb. 1987, published in U.S.A.
E–Z–Go, It Lifts More Than Just Your Productivity, p. 1–2, dated Sep. 1992, published in U.S.A.

*Primary Examiner*—Stephen T. Gordon

[57] ABSTRACT

An attachment mounting structure is provided for cargo bed and sprayer assembly attachments usable on a utility vehicle adapted for use in turf related applications. The structure includes pivotable supports between each attachment and the vehicle frame that permit them to be interchangeably mounted on the vehicle. The structure further includes a connection on each attachment that permits it to be secured to a hydraulic cylinder carried by the vehicle, thereby allowing the attachment to be tilted upward and rearwardly so as to provide access to the engine and/or related drive components carried beneath the attachment. The mounting structure also permits the two attachments to be quickly and easily interchanged so that the vehicle could be better utilized.

9 Claims, 2 Drawing Sheets

ATTACHMENT MOUNTING STRUCTURE

1. FIELD OF THE INVENTION

The present invention relates generally to small utility vehicles having an operator station at the front and a cargo bed extending therebehind. More specifically, it relates to a mounting structure usable with a sprayer attachment that allows it or the cargo bed of such a vehicle to be interchangeably utilized with the vehicle.

2. BACKGROUND OF THE INVENTION

Small vehicles such as the John Deere heavy duty utility vehicle are commonly being used for turf maintenance activities since they are highly maneuverable, are equipped to operate over a low speed range, cause minimum turf damage due to their low tire pressures, and are readily adaptable to the use of a variety of special attachments utilized in turf maintenance applications.

These utility vehicles place the operator station in the forward end, the cargo bed behind the operator and the engine and/or related drive components beneath the bed. When an attachment such as a sprayer assembly is utilized with the utility vehicle to apply fertilizer, insecticides, herbicides and related treatments, it has either been secured to the cargo bed or the bed has been removed and the assembly has been rigidly secured to the vehicle frame.

Because sprayer assemblies are bulky, including a large fluid tank and an elaborate boom apparatus, it is preferable that the bed be removed and they be mounted close to the vehicle frame to provide a low center of gravity and better stability. Since the engine and/or related drive components are commonly housed beneath the cargo bed or sprayer assembly, access to them for service, maintenance and repairs can be difficult.

One sprayer assembly has been rigidly mounted to a utility vehicle slightly above its frame, once the cargo bed has been removed. This opening, provided between the frames of the vehicle and assembly, allows the operator to reach between the vehicle frame and the assembly to service the engine and/or related components. While this permits minor service tasks such as the checking of fluid levels to be carried out, major repairs and/or maintenance can be very difficult or may require that the sprayer assembly be removed. Since this assembly has been fixed to the vehicle, it is not quickly and easily removed to allow for service or use of other attachments with the vehicle.

SUMMARY OF THE INVENTION

It would therefore be desirable to provide a sprayer assembly for use on a utility vehicle which has been adapted to be used in turf maintenance and related applications.

It would additionally be desirable to provide a sprayer assembly that can be mounted to the vehicle frame instead of to the cargo bed to provide for a stable vehicle-attachment combination. It would further be desirable to provide a mounting structure for such an assembly that allows it to be easily and quickly mounted on the vehicle when needed or removed so that other attachments such as the cargo bed, a granular spreader or top dresser can be used with the vehicle when desired.

Further it would be desirable to provide a mounting structure that allows the assembly or a similar attachment to be easily and quickly raised above the vehicle engine and/or related drive components to permit maintenance, repair and servicing activities. Additionally, it would be desirable to provide a locking means to secure the sprayer assembly to the vehicle frame during operation to improve stability as well as a locking means that secures the assembly in its raised position to provide for safe servicing activities.

Towards these ends, there is provided a means for and method of mounting a sprayer assembly, cargo bed and/or other attachments to the frame of a vehicle such as a utility vehicle so that they can be easily and quickly installed or removed to allow the use of multiple attachments with the vehicle. There is further provided means for tilting the sprayer assembly and/or other attachments upwardly and rearwardly to permit access to the vehicle engine and/or related drive components for service, maintenance and repairs as well as locking means to secure the attachment in either its raised or operational position.

DESCRIPTION OF THE PREFERRED EMBODIMENT

Figure 1:
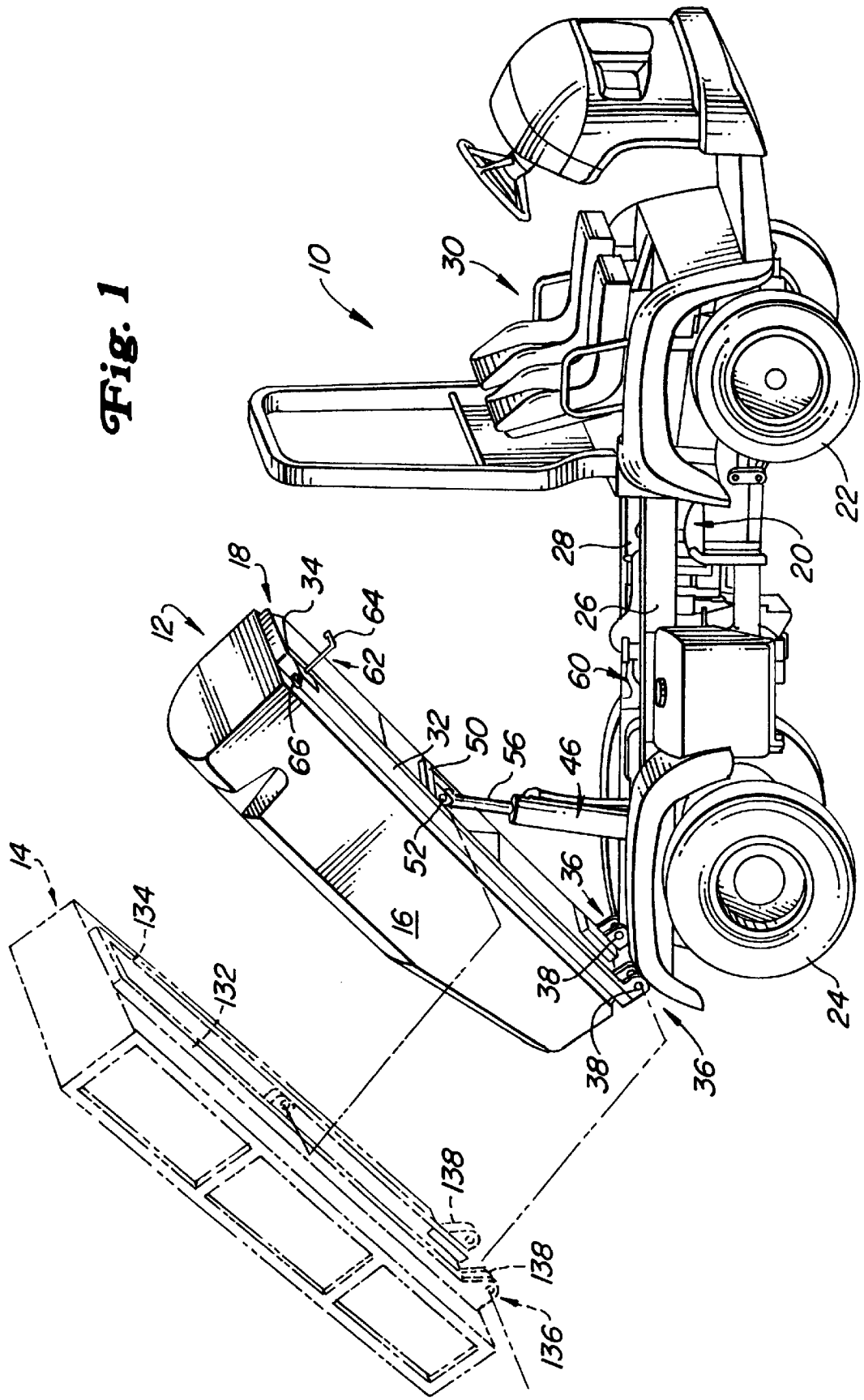
FIG. 1 is a front left elevated perspective view of utility vehicle with a sprayer assembly attachment mounted in its raised configuration. An alternate cargo bed attachment is illustrated in phantom.

Looking first to FIG. 1 there is illustrated a utility vehicle 10 with a sprayer assembly attachment 12 mounted thereon. In phantom lines there is illustrated a cargo bed 14 which could be mounted on the vehicle 10 in place of the sprayer attachment 12. While only the tank 16 and its support frame 18 of the assembly 12 are illustrated, the sprayer assembly 12 would commonly include sprayer booms and related distribution apparatus.

The vehicle 10 includes a frame 20 carried on front and rear support wheels 22 and 24, the frame 20 having a pair of fore-and-aft extending and laterally spaced-apart first and second frame members 26 and 28. At the forward end of the vehicle 10 is carried an operator station 30 positioned generally above the front wheels 22. Rearwardly of the operator station 30 and extending therebehind is the sprayer assembly 12 which includes the tank 16 carried on its support frame 18. The tank support frame 18 is also provided with fore-and-aft extending and laterally spaced apart third and fourth frame members 32 and 34. These frame members 32 and 34 are spaced apart sufficiently to be positioned generally over the respective first and second fore-and-aft extending vehicle frame members 26 and 28 when the assembly 12 is lowered to an operator position. Between the rear portions of the first and second frame members 26 and 28 of the vehicle 10 and the third and fourth frame members 32 and 34 of the assembly 12 are provided pivot structures 36 which permit the assembly 12 to be moved between the raised position illustrated in FIG. 1 and a lowered operational position.

Figure 2:
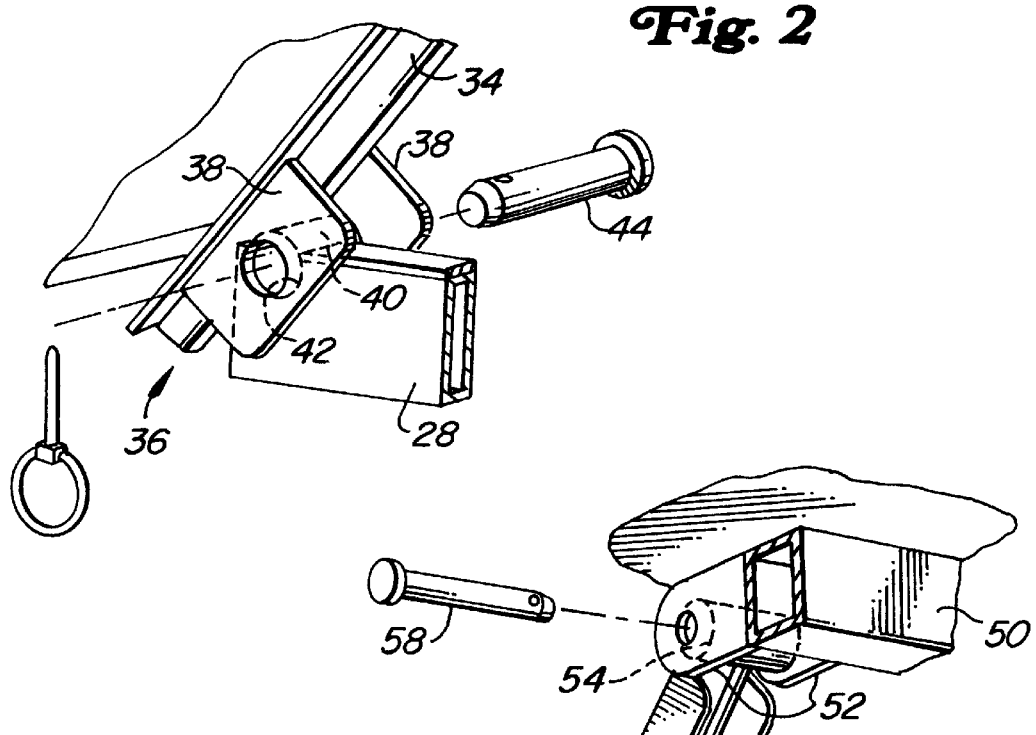
FIG. 2 is an enlarged view of one pivot structure provided between the frame of the utility vehicle and the sprayer assembly.

Looking now to FIG. 2, there is shown an enlarged view of one of the pivot structures 36 provided between the two frame members 26 and 28 of the utility vehicle 10 and the two support frame members 32 and 34 of the sprayer assembly 12. Essentially identical pivot structures 36 are provided between each fore-and-aft extending pair 26 and 32, and 28 and 34 of vehicle and assembly members. Since these pivot structures 36 are identical, only one of the pivot structures 36 will be described in detail. As shown in FIG. 2, the pivot structures 36 include two ears 38 which extend downwardly from the assembly frame member 34 to be adjacent each side of a sleeve 40 secured to the rear portion of the vehicle frame member 28. This sleeve and ear arrangement could just as well be reversed between the vehicle and assembly frame members 28 and 34. Each of the ears 38, as well as the sleeve member 40 are provided with openings 42 through which a pin 44 can be inserted to secure the assembly 12 on the vehicle 10 and provide for it to swing upwardly and rearwardly.

Figure 3:
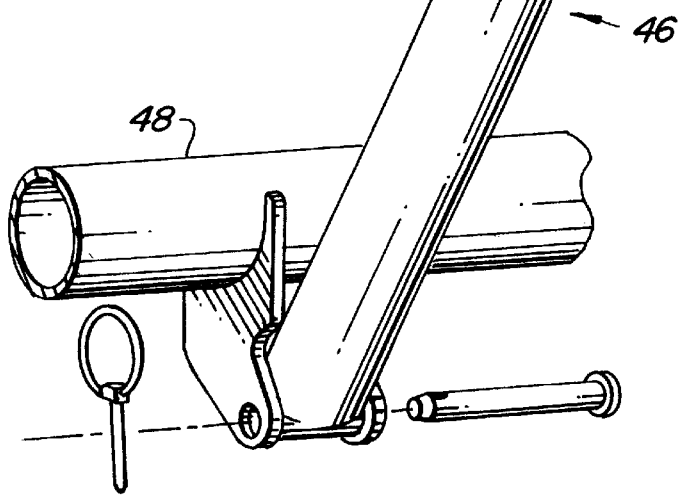
FIG. 3 is an enlarged view of the connection between the hydraulic cylinder and the vehicle and tank frames. Also illustrated is the locking means used to secure the hydraulic cylinder in its extended position.

The sprayer assembly 12 of FIG. 1 is illustrated in an upwardly and rearwardly tilted orientation. It is raised to this position through the use of the hydraulic cylinder 46 mounted on a cross member 48 carried between the first and second frame members 26 and 28 of the vehicle 10 (see FIG. 3). The third and fourth fore-and-aft extending and laterally spaced apart tank support frame members 32 and 34 also carry a cross member 50, see FIG. 3, which in turn is provided with a pair of rearwardly extending ears 52 that are sized to receive the pivot sleeve 54 carried at the end of the hydraulic cylinder ram 56. Insertion of a pin 58 into openings provided in the ears 52 and sleeve 54 permits the assembly 12 to be quickly coupled with or decoupled from the rod end 56 of the hydraulic cylinder 46.

As can be seen in FIG. 1, the engine and/or related drive components 60 of the utility vehicle 10 are exposed when the assembly 12 has been raised. These power and drive components 60 are carried between the fore-and-aft extending first and second frame members 26 and 28 and rearwardly of the operator station 30. They are mounted below the level of the first and second frame members 26 and 28 and therefore are below the tank 16 and its frame 18 when they are in a lowered and operational position.

Also shown in FIG. 1 is a locking means 62 provided between the assembly 12 and vehicle 10 to secure the assembly 12 in its lowered and operational position. This feature is provided since the fluid in the tank 16 will shift during operation, making it desirable to secure both ends of the assembly 12 to the vehicle frame 20. The locking means 62 includes a J-bolt 64 carried on one assembly support frame 32. This J-bolt 64 is swingably secured to the assembly frame member 32 and can quickly rotated beneath the vehicle frame member 26 to lock the assembly 12 in the operational position illustrated in FIG. 1. A nut 66 is provided on the J-bolt 64 to tighten it in place.

An additional locking means is provided to secure the hydraulic cylinder 46 in the extended and raised position shown in FIG. 1 to safely permit service activities to be carried out. This locking means could take the form of the removable brace 68 illustrated in FIG. 3 or similar means could be provided between the assembly and vehicle frame members 26 and 32, and 28 and 34.

The utility vehicle 10 is generally sold with the cargo bed 14 mounted on the vehicle 10 rearwardly of the operator station 30. With the present invention, this bed 14, as illustrated in FIG. 1, would also have a frame including third and fourth fore and aft extending and laterally spaced-apart frame members 132 and 134 that would have pivot structures 136 adapted to be coupled with the first and second frame members 26 and 28 of the vehicle 10 to allow it to be pivotally raised and lowered by the hydraulic cylinder 46 provided with the utility vehicle 10.

Through providing similar pivot structures on the cargo bed attachment 14 and sprayer assembly attachment 12, the vehicle 10 can be utilized with either attachment. Other attachments could also be provided with similar compatible pivot and mounting connections to allow multiple uses of the vehicle.

To utilize the sprayer assembly 12 with the utility vehicle 10 requires that the pivot structures 136 of the cargo bed 14 attachment first be decoupled by removing the pins 44 from the pivot ears 138 on the cargo bed vehicle frame members 132 and 134, decoupling the hydraulic cylinder ram 46 from the cargo bed 14 and removing the bed 14 from the vehicle 10. The sprayer assembly 12 attachment would then be lifted over the cargo bed area of the vehicle 10, the ears 38 of the pivot structures 36 carried on the tank frame members 32 and 34 aligned to permit insertion of the pins 44 and the hydraulic cylinder 46 connected to the assembly support frame 18. The assembly 12 is then operational.

When use of the sprayer assembly 12 has been concluded and the utility vehicle 10 is to be used in other applications, the sprayer assembly 12 attachment can be quickly and easily removed from the vehicle frame 20 through removal of the pivot pins 44 from the pivot structures 36 and disconnecting the rod end 56 of the hydraulic cylinder 46 from the tank support cross frame 50. The assembly 12 can then be lifted from the vehicle 10 and the cargo bed 14 or other attachment installed.

With the present structure there is provided a quick and easy means for mounting a sprayer assembly to the cargo bed of a utility vehicle and for providing for that assembly to be mounted closely adjacent the framework to provide a low center of gravity and stability during operation. Further there is provided the ability to raise and lower the sprayer tank assembly to permit quick and easy access to the engine, transmission and/or related drive components carried by the vehicle beneath the sprayer assembly unit.

We claim:

1. In a vehicle adapted to carry a removable cargo bed, said vehicle having a frame including laterally spaced apart fore-and-aft extending first and second members;

ground engaging wheels carried at the front and rear of the frame;

an operator station carried at the forward end of the frame;

drive components carried by the frame between the members and rearwardly of the operator station;

and an attachment assembly removably mountable on the frame when the bed has been removed, said assembly extending rearwardly from the operator station and including mounting means adapted to removably mount the assembly to said first and second members and pivotally tilt said assembly upwardly to provide access to said drive components, said mounting means including first and second laterally spaced apart pivot structures carried between said first and second frame members and said assembly, an extensible and retractable power means carried by the frame, rearwardly of the operator station and between said first and second members;

and means for removably connecting the power means to said assembly and vehicle to permit the assembly to be moved between a first working position adjacent the first and second members and a second upwardly tilted position.

2. The invention defined in claim 1 wherein the assembly includes a tank carried on a support frame, said support frame being secured to third and fourth frame members and said power means is an hydraulic cylinder having a rod end which can be removably secured to the support frame.

3. The invention defined in claim 1, wherein the assembly includes third and fourth fore and aft extending and laterally spaced apart frame members which are closely adjacent to and generally above the first and second frame members respectively when the assembly is in its first position.

4. The invention defined in claim 3, wherein the pivot structures are carried at rear portions of the frame members to permit the assembly to tilt rearwardly.

5. The invention defined in claim 4 wherein means are provided between the assembly and vehicle frame for releasably securing the assembly is in its upwardly tilted position.

6. The invention defined in claim 3 wherein each of the frame members include mounting structures wherein pins can be removably received to pivotally support the third and fourth members on the first and second members.

7. The invention defined in claim 6 wherein the mounting structures are at the rear portions of the frame members to permit the assembly to tilt rearwardly.

8. The invention defined in claim 3 wherein locking means are provided between the first and third frame members and between the second and fourth frame members for releasably securing them together when the assembly is in its working position.

9. The invention defined in claim 8 wherein the locking means are forwardly spaced of the pivot structures.

\* \* \* \* \*